United States Patent [19]

Lesikar

[11] Patent Number: 4,699,553
[45] Date of Patent: Oct. 13, 1987

[54] COTTER RING LOCKING DEVICE

[75] Inventor: Johnie N. Lesikar, Savannah, Ga.

[73] Assignee: Roper Corporation, Kankakee, Ill.

[21] Appl. No.: 806,792

[22] Filed: Dec. 9, 1985

[51] Int. Cl.$^4$ ............................................. F16B 21/18
[52] U.S. Cl. .................................... 411/353; 411/514; 411/530; 403/155
[58] Field of Search ............................. 411/209-211, 411/248-251, 318, 351-353, 356, 513, 514, 517, 530; 301/113; 403/155; 70/458; 24/237; 267/155-157

[56] References Cited

U.S. PATENT DOCUMENTS

| | | |
|---|---|---|
| 29,062 | 7/1898 | Lauber . |
| 482,670 | 9/1892 | Ackerman . |
| 884,199 | 4/1908 | North .................................. 411/249 |
| 932,787 | 8/1909 | Kirby . |
| 1,074,985 | 10/1913 | Smith . |
| 1,107,881 | 8/1914 | Kilstofte . |
| 2,242,593 | 5/1941 | Olson ................................. 267/155 |
| 2,287,634 | 6/1942 | Niven . |
| 2,399,119 | 4/1946 | Howell .............................. 411/530 |
| 2,686,450 | 8/1954 | Sander .............................. 267/155 |
| 3,874,802 | 4/1975 | Lindsey . |
| 3,975,979 | 8/1976 | Stoddard ........................... 411/530 |
| 3,986,428 | 10/1976 | Ledford et al. ................... 411/530 |
| 4,191,038 | 3/1980 | Vaughn .............................. 70/458 |
| 4,298,299 | 11/1981 | Quarles ............................. 411/514 |

Primary Examiner—Neill Wilson
Attorney, Agent, or Firm—Leydig, Voit & Mayer

[57] ABSTRACT

A releasable locking device for mounting in the bore of a shaft or the like for retaining an element thereon. The releasable locking device is in the form of a cotter ring comprising a one piece rod formed of flexible material and having a leading portion, a central portion and a trailing portion. The central portion is wound in the form of a helix so as to form more than one but less that two full helical turns with adjacent turns being separated by a distance insufficient for the rod to be freely trained through the bore of the shaft during mounting. The leading portion extends tangentially from the central portion so as to define a lead that is freely insertable into the bore, and the trailing portion is helically shaped in axially flared relation to the central portion in a manner that progressively increases the axial spacing between the trailing portion and the immediately adjacent turn of the central portion to facilitate removal of the device from a locked position.

11 Claims, 6 Drawing Figures

COTTER RING LOCKING DEVICE

DESCRIPTION OF THE INVENTION

The present invention relates generally to releasable locking devices, and more particularly to an improved locking ring adaptable for releasable insertion into the bore of a shaft or the like for retaining an element on the shaft.

Various types of keepers or fasteners have been devised for detachable connection to one member in order to inhibit movement of another element relative thereto. For example, hair pin cotters often are utilized on the free end of a shackle pin to retain members mounted on the shackle pin.

In the past, however, cotter pins, split rings and similar types of spring or wire-like locking elements have been difficult to manipulate both during locking and release, thus making them impractical and unsuitable for many applications. Moreover, some releasable locking devices, such as hair pin cotters, are susceptible to accidental or unintentional disengagement. In its working environment, the hair pin cotter may be subjected to a momentary force that disengages cotter from the bore of the shackle pin or shaft in which it is positioned.

It is an object of the present invention to provide an improved releasable locking device that is easy to lock and release, but yet is not susceptible to accidental release.

Another object is to provide a releasable locking device as characterized above that can be moved between locked and released conditions without requiring a high degree of dexterity by the user or the use of tools.

A further object is to provide a releasable locking device of the foregoing type that is inexpensive and reusable.

Other objects and advantages of the invention will become apparent upon reading the following detailed description and upon reference to the drawings, in which.

While the invention will be described in connection with a preferred embodiment, it will be understood that it is not intended to limit the invention to the particular form disclosed. On the contrary, it is intended to cover all alternatives and equivalents as may be included within the spirit and scope of the invention.

Figure 1:
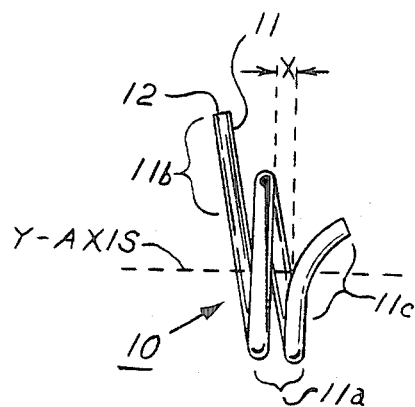
FIG. 1 is a side view of a releasable locking device in accordance with the invention.
Figure 2:
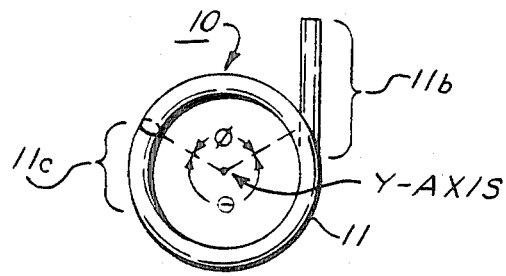
FIG. 2 is a plan view of the releasable locking device shown in FIG. 1.
Figure 3A:
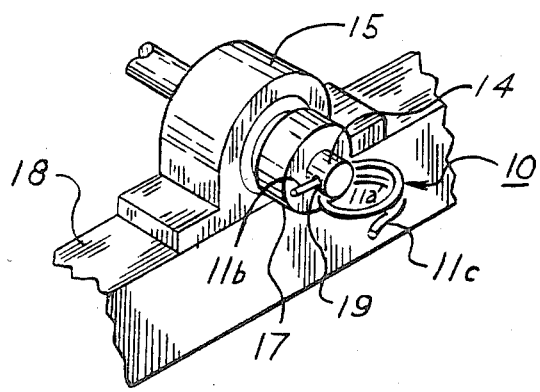
FIG. 3a is a perspective of a shackle pin supported in a pillow block and showing the illustrated locking device with a leading end portion being inserted through a bore of the shackle pin.
Figure 3B:
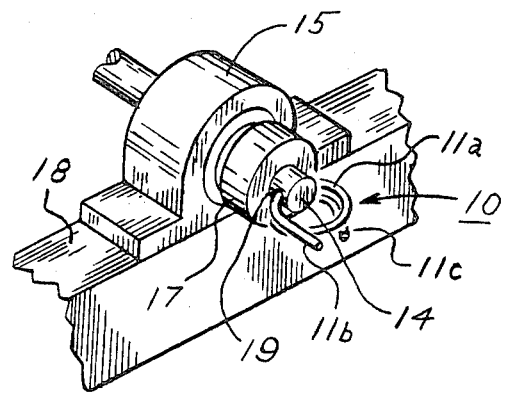
FIG. 3b is a perspective, similar to FIG. 3a, showing the locking device being advanced through the bore of the shackle pin toward its locking position.
Figure 3C:
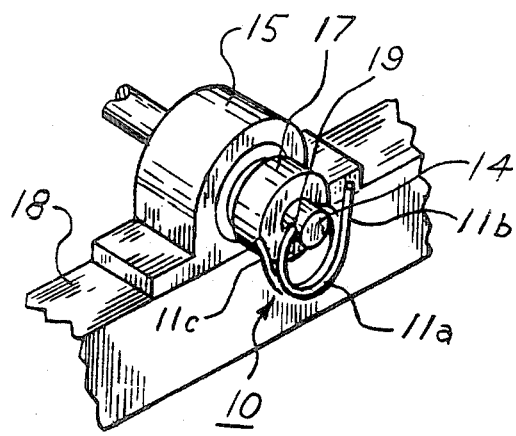
FIG. 3c is a perspective, similar to FIGS. 3a and 3b, showing the locking device fully advanced through the bore of the shackle pin to its locked position.
Figure 3D:
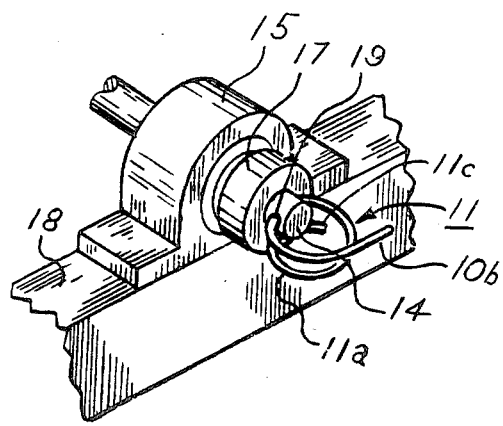
FIG. 3d is a perspective, similar to FIGS. 3a-3c, showing the locking device in a partially withdrawn condition from the shackle pin.

Referring more particularly to FIGS. 1 and 2 of the drawings, there is shown an illustrative locking device 10 embodying the present invention, comprising a one-piece rod 11, in this instance having a circular cross section. The rod 11 has a central portion 11a shaped generally in the form of a helix, a leading portion 11b extending from one end of the central portion, and a trailing portion 11c extending from the opposite end of the central portion 11a. The rod preferably is formed of spring steel, and may be provided with a protective finish, such as zinc or chromate.

For purposes of illustration, the locking device 10 is shown in FIGS. 3a-3d for use with a shackle pin 14. The shackle pin 14 in this case carries a collar 17 and is mounted in a conventional pillow block 15, which in turn is supported on a beam 18. It will be appreciated that the locking device 10 may be used in many other applications which typically employ counter pins, split rings, or the like.

In accordance with the invention, the leading, central and trailing portions of the rod are shaped to permit free threading of the leading portion of the rod into a bore of the shackle pin, resist passage of the central portion through the bore, allow free movement of the device over a limited area of the central portion when in the locked position, and allow relatively easy unlocking of the device. To this end, in the illustrated device 10, the leading portion 11b of the rod is substantially linear and tangentially oriented relative to the helix formed by the central portion 11a in order to allow the rod to be easily threaded into a bore 19 of the shackle pin 14. It will be understood that the leading portion 11b may take other forms so long as it does not impede the insertion of the leading portion into the bore 19 and allows the shackle pin to be freely brought into firm engagement between the leading portion 11b and the immediately adjacent turn of the central portion 11a prior to initiating threading of the central portion 11a through the bore.

In carrying out the invention, the helix of the central portion 11a is formed with a predetermined discreet spacing X between adjacent turns which prevents free passage of the central portion of the rod through the bore, but yet permits the rod to be forced through the bore without undue effort by manually turning or rotating the central portion 11a about the longitudinally axis of the helix, with adjacent turns of the rod being urged in separating relation against the biasing force of the material of the rod. It will be appreciated that the pitch and diameter of the helix will be dependent upon the gauge of the wire and the particular application of the device, and that the separation experienced between turns during mounting should not exceed the elastic limit of the material of the rod so as to create permanent deformation.

In further keeping with the invention, the helical central portion of the rod preferably is formed with more than one full helical turn but less than two turns so as to permit the device to be moved into a locked position in which it is freely suspended from the pin 14, but yet positively retained against accidental disengagement. The central portion of the rod 11 in this case is of a length sufficient to form approximately one and one half helical turns such that, when viewed along the axis of the helix as shown in FIG. 2, an angle $\theta$ of approximately 260° includes two turns, and the remaining angle $\phi$ of approximately 100° is in the form of a single turn.

When mounting the locking device 10 in the bore of the shackle pin 14, it can be seen that the leading rod portion 11b is freely insertable into the bore until the pin is snugly engaged between the leading portion 11b and the immediately adjacent turn of the central portion 11a. Manual rotation of the central portion 11a will then cause a separation between the leading portion and the immediately adjacent turn, and as the central portion is rotated further, the adjacent turns of the central portion will be urged apart to permit threading of the rod through the bore until the area or section of the central portion comprising a single turn is reached, at which point the biasing force between the turns of the central portion are relieved and the locking device 10 is freely suspended from the pin for limited relative movement. The locking device 10 is positively retained in such locked position by the double turned sections of the device.

It has been found as the locking device 10 is advanced into the locked position, the separating movement between adjacent turns of the the cental portion creates a twisting or torsional action along a length of the rod. Such torsion causes the rod to positively grip the shackle pin 14, but with a force that can be overcome by manual rotation of the device. Because the rod twists along its length, instead of bending in a relatively limited area, the rod is less likely to succumb to metal fatigue after repeated usage than conventional cotter pins and rings. The permanent longitudinal spacing between adjacent turns of the helix, furthermore, reduces the forces that must be exerted when initiating the mounting movement. Instead, the resistance increases gradually and allows the user to begin the installation with small force that may be increased smoothly as the threading action of the central portion of the rod proceeds through the bore. Once in locked position, the spacing between the adjacent turns of the central portion resists accidental unthreading of the locking device by again creating a torsional gripping action on the shackle pin in the event the locking device is struck by an accidental blow. Moreover, such an accidental blow would not normally provide the distinct rotational manipulation of the device necessary in effecting removal.

In further keeping with the invention, the trailing portion 11c of the rod is formed in outwardly flared deviating fashion from the central portion so as to facilitate manual removal of the locking device from the bore of the shackle pin 14. The trailing portion 11c of the rod in this case has a helical configuration which extends in outwardly flared fashion from the central portion to a point that the axial spacing between the terminal end of the trailing portion 11c and the immediately adjacent turn of the central portion is sufficient to freely receive a portion of the shackle pin prior to initiating separation between the trailing portion and the adjacent turn of the central portion. Hence, by rotating the central portion 11a of the rod 11 in a direction counter to that in which it was rotated during mounting, the shackle pin 14 can be easily moved into position between the trailing portion 11c and the immediately adjacent turn of the central portion. Manual forceful rotation of the central portion 11a will then cause a yielding separation between the adjacent turns of the rod as the rod is unthreaded from the bore of the shackle pin. As in the case of mounting, such separating movement between adjacent turns again creates a distinct gripping force on the shackle pin, which is overcome by manual rotation of the device, and a torsional twisting along an extended length of the rod. The predetermined permanent spacing between the adjacent turns similarly facilitates initiation of the unlocking movement and unthreading of the device from the shackle pin bore.

From the foregoing, it will be appreciated that a locking device of the present invention is adapted for relative inexpensive manufacture, but yet provides increased reliability, easier locking and releasing, and a longer usable life. Because the helical shape of the releasable locking device distributes torsional forces along the length of the rod as it is moved between locked and released positions, the device may be made of heavier gauge wire than is possible with releasable locking devices that depend on bending over a relatively small area. Hence, the releasable locking device of the invention is adaptable to a wide range of applications in either light or heavy-duty working environments.

I claim and my invention:

1. A locking device for releasable mounting in the bore of a shaft or the like comprising a one piece rod formed of flexible material and having a leading portion, a central portion, and a trailing portion; said central portion being wound in a helical configuration with adjacent turns thereof being disposed with a discreet spacing and without contact therebetween when in a normal unbiased condition, said spacing being less than the distance required for the rod to be trained freely through the bore of said shaft; said leading portion extending from said central portion for forming a lead that is freely insertable into said bore; said trailing portion extending from said central portion in a manner that progressively increases the axial spacing between said trailing portion and the immediately adjacent turn of the central portion; said rod being positionable into locking relation with said shaft by inserting the leading portion into said bore and rotation said central portion relative to said shaft and thereby urging adjacent turns of said rod in separating relation against the biasing force of the material of said rod until said central portion is rotated to a locked position at which said biasing force is relieved and said central portion is positively retained in said bore without any portions of said turns being in contacting relation with each other; and said central portion being rotatable in an opposite direction from said locked position to effect removal of said rod from said bore with a portion of said shaft being freely positionable between said trailing portion and central portion upon initiating said opposite rotational movement of said central portion.

2. The locking device of claim 1 in which said leading portion extends tangentially from said central portion.

3. The locking device of claim 2 in which said trailing portion extends in axially flared relation from said central portion.

4. The locking device of claim 3 in which said trailing portion has a helical shape.

5. The locking device of claim 1 in which the turns of said central portion are formed such that upon rotation of said central rod portion to said locked position the rod twists about a longitudinal axis of the helix of said central portion as adjacent turns are forced in separating relation against the biasing force of said rod, thereby causing the rod to positively grip the shaft.

6. The locking device of claim 1 in which said central portion is formed with more than one but less than two full helical turns.

7. In a locking assembly for retaining a first element on a second element including a cotter ring locking device for mounting in a bore of the second element to prevent removal of said first element therefrom, said cotter ring locking device comprising a one piece rod formed of flexible material and having a leading portion, a central portion, and a trailing portion; said central portion being wound in a helical configuration so as to form more than one turn but less than two helical turns with adjacent turns being disposed with a discreet spacing and without contact therebetween when in a normal unbiased condition, said spacing being less than the distance required for the rod to be freely trained through the bore of said second element during mounting; said leading portion being formed in deviating fashion from said central portion to define a lead that is freely insertable into said bore; said rod being positionable into locking relation with said shaft by inserting the leading portion into said bore and rotating said central portion relative to said shaft and thereby urging adjacent turns of said rod in separating relation against the biasing force of the material of said rod until said central portion is rotated to a locked position at which said biasing force is relieved and said central portion is positively retained in said bore without any portions of said turns being in contacting relation with each other; and said trailing portion of said rod being formed in deviating fashion from said central portion so that the axial spacing between said trailing portion and the immediately adjacent turn of said central portion progressively increases to a point that the axial space between the terminal end of said trailing portion and the immediately adjacent turn of said central portion is sufficient to freely receive a portion of said second element upon initiating removal of said rod from said second element.

8. The assembly of claim 7 wherein said leading portion extends tangentially from one of the helical turns of said central portion.

9. The locking device of claim 8 in which said trailing portion has a helical shape.

10. The assembly of claim 7 in which said rod is freely moveable relative to said pin over a predetermined length thereof when in said locked position.

11. The assembly of claim 10 in which said rod twists along its length in response to separation of adjacent turns of said central portion during rotation thereof to and from said locking position.

* * * * *